United States Patent
Chernoff et al.

(10) Patent No.: US 7,159,931 B2
(45) Date of Patent: Jan. 9, 2007

(54) AUTOMOTIVE ROOF RACK AND ACCESSORIES MANUFACTURED WITH QPF/SPF TECHNOLOGY

(75) Inventors: Adrian B. Chernoff, Troy, MI (US); Richard M. Kleber, Clarkston, MI (US); Chongmin Kim, Bloomfield Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 93 days.

(21) Appl. No.: 11/067,579

(22) Filed: Feb. 25, 2005

(65) Prior Publication Data

US 2005/0189787 A1    Sep. 1, 2005

Related U.S. Application Data

(60) Provisional application No. 60/548,358, filed on Feb. 27, 2004.

(51) Int. Cl.
    *B60J 7/00* (2006.01)
(52) U.S. Cl. .................. 296/187.01; 296/210; 224/321
(58) Field of Classification Search ........... 296/187.01, 296/210, 100.02, 100.1; 224/309, 321, 324, 224/326
    See application file for complete search history.

(56) References Cited

U.S. PATENT DOCUMENTS

| | | | | |
|---|---|---|---|---|
| 4,433,867 A | * | 2/1984 | Perry et al. ............... | 296/146.9 |
| 5,454,499 A | * | 10/1995 | Gibbs ......................... | 224/324 |
| 5,549,229 A | * | 8/1996 | Grabowski .................. | 224/321 |
| 5,974,847 A | | 11/1999 | Saunders et al. ............. | 72/57 |
| 6,253,588 B1 | | 7/2001 | Rashid et al. .................. | 72/57 |
| 6,299,244 B1 | * | 10/2001 | Tarahomi .................... | 296/210 |
| 6,305,740 B1 | * | 10/2001 | Staser et al. ................ | 296/222 |
| 6,309,011 B1 | * | 10/2001 | Matsuyama et al. ... | 296/187.05 |
| 6,357,819 B1 | * | 3/2002 | Yoshino ................ | 296/187.02 |
| 6,423,894 B1 | * | 7/2002 | Patz et al. ................... | 296/210 |
| 6,550,847 B1 | * | 4/2003 | Honda et al. ............ | 296/146.6 |
| 6,675,621 B1 | | 1/2004 | Kleber et al. .................. | 72/60 |
| 6,694,790 B1 | | 2/2004 | Ryntz et al. .................... | 72/60 |
| 6,825,442 B1 | | 11/2004 | Schroth et al. ............. | 219/137 |
| 2005/0124730 A1 | * | 6/2005 | Yamazaki ................... | 523/218 |

* cited by examiner

*Primary Examiner*—Kiran B. Patel
(74) *Attorney, Agent, or Firm*—Kathryn A. Marra

(57) ABSTRACT

An integrally designed roof rack and roof panel attached to a vehicle may be formed using quick plastic forming (QPF) and superplastic forming processing (SPF). A number of vehicle accessories such as luggage containers, fuel tanks, consoles, door attachments, truck beds and table trays may be formed using QPF processes. The items may be installed and movable onto and off the vehicle. A variety of QPF processes may be employed, enabling the vehicle accessory to meet required strength, dimensional, and shape considerations. Additionally, component integration is enabled by using QPF processes.

2 Claims, 3 Drawing Sheets

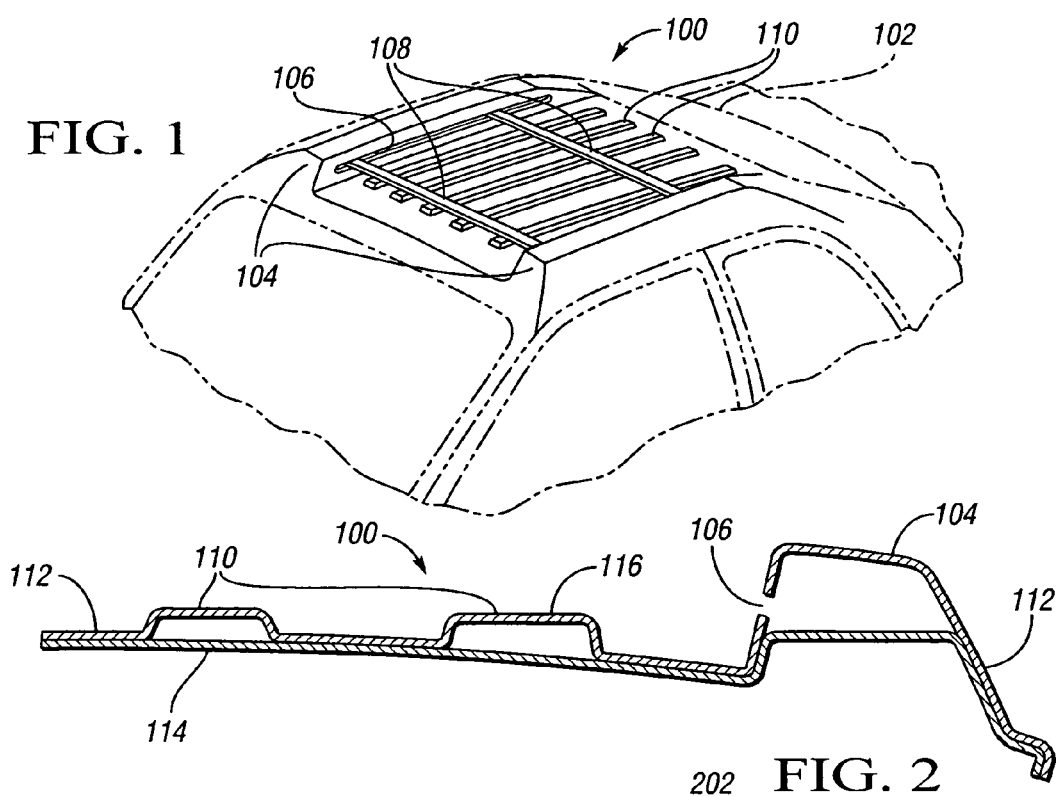
FIG. 1
FIG. 2
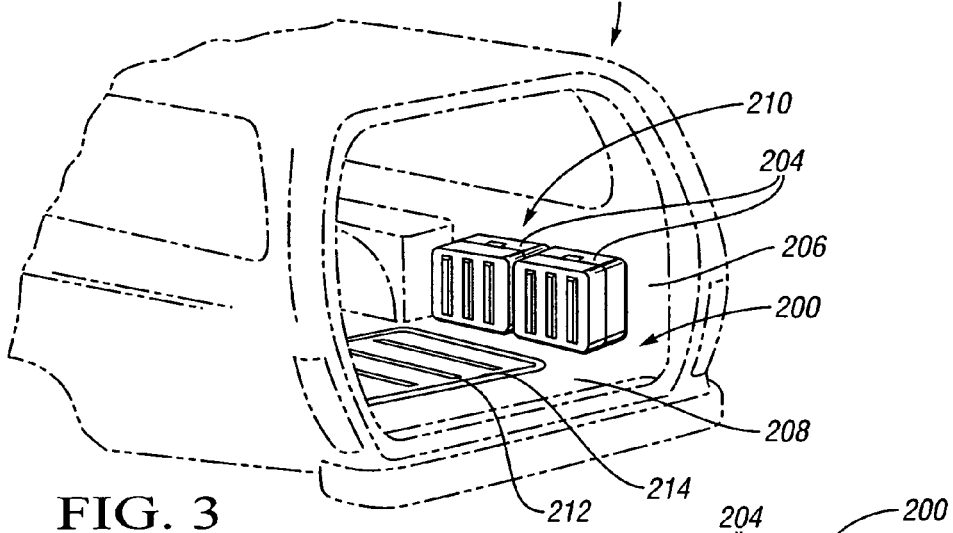
FIG. 3
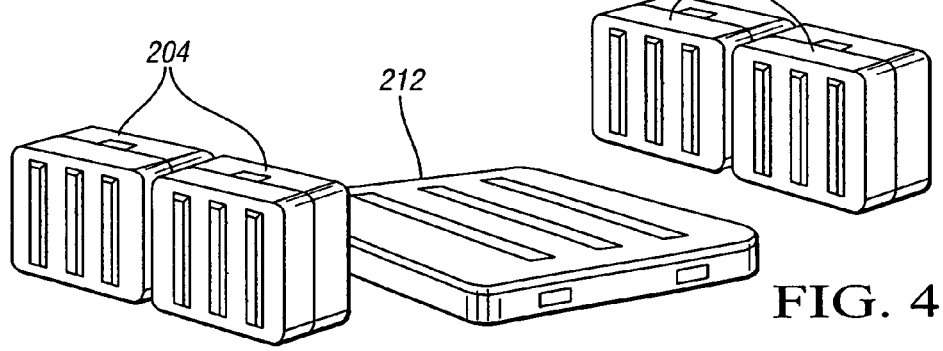
FIG. 4

//==

AUTOMOTIVE ROOF RACK AND ACCESSORIES MANUFACTURED WITH QPF/SPF TECHNOLOGY

CROSS REFERENCE TO RELATED APPLICATIONS

This Application claims the benefit of U.S. Provisional Application No. 60/548,358 filed Feb. 27, 2004, which is hereby incorporated by reference in its entirety.

TECHNICAL FIELD

This invention relates to an integrally designed roof rack and roof panel and various other accessories, external hardware and contained volumes for use in the interior and exterior of a vehicle.

BACKGROUND OF THE INVENTION

Automotive roof racks are generally used for mounting cargo, bicycles and other items to the roof of a vehicle. A typical prior art vehicle roof rack is mounted onto the upper surface of a vehicle. The roof racks are manufactured as separate structures and are generally assembled prior to use. The prior art roof rack is mounted onto the vehicle body by bolts or other various means.

Accessories, external hardware and contained volumes for use in the interior and exterior of a vehicle are typically manufactured as separate components from the vehicle and are typically composed of plastics.

SUMMARY OF THE INVENTION

The present invention relates to an integrally designed roof rack and roof panel for a vehicle. The roof rack and roof panel is characterized by a metal inner panel and a metal outer panel forming a portion of the upper surface of the vehicle body. The metal inner panel is operatively connected to the metal outer panel. At least one of the metal inner and metal outer panels has raised portions extending longitudinally, spaced a distance apart from one another, and at least partially defining a cavity therebetween.

In another aspect of the invention, at least one of the raised portions along one of the metal inner and outer panels at least partially defines an opening.

In another aspect of the invention, a cross member extends transversely between the raised portions and is at least partially within the opening defined in at least one of the raised portions.

In another aspect of the invention, the opening defined in at least one of the raised portions is elongated and the cross member is selectively translatable fore and aft.

In another aspect of the invention, the metal outer panel has at least one raised portion extending transversely across the upper surface of the vehicle body, which at least partially defines a strengthening rib for enhancing the stiffness and load bearing capabilities of the metal outer panel.

In another aspect of the invention, a method of producing the integrally designed roof rack and roof panel is provided. The roof rack and roof panel and other vehicle accessories, external hardware and contained volumes may be made of single sheet quick plastic forming, multiple sheet quick plastic forming, blow forming, tailor welded blanks, metallic foam forming or variations of the quick plastic forming metal forming technology which may be made of the superplastic forming of metals like magnesium and aluminum.

The above features and advantages, and other features and advantages, of the present invention are readily apparent from the following detailed description of the best mode for carrying out the invention when taken in connection with the accompanying drawings.

BRIEF DESCRIPTION OF THE DRAWINGS

FIG. 1 is a schematic perspective illustration of an integral roof rack and roof panel;

FIG. 2 is a fragmentary schematic cross-sectional illustration of the integral roof rack and roof panel of FIG. 1;

FIG. 3 is a fragmentary schematic illustration of a vehicle with luggage and container storage system;

FIG. 4 is a schematic illustration of a luggage and container storage system;

DESCRIPTION OF THE PREFERRED EMBODIMENTS

Figure 5:
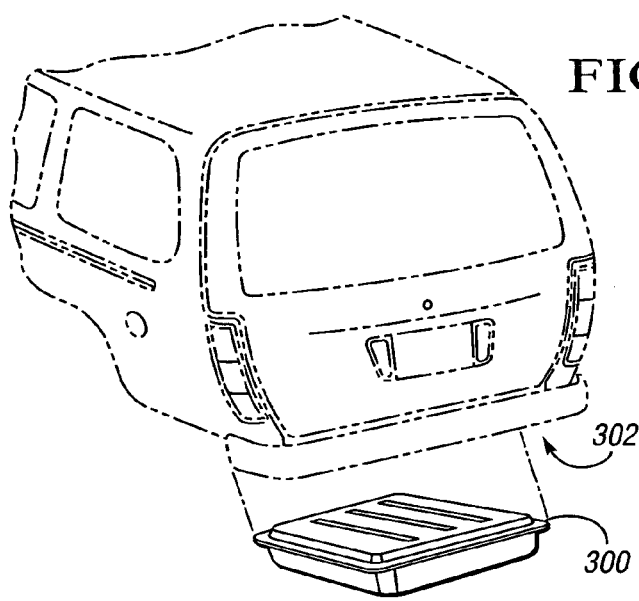
FIG. 5 is a schematic exploded illustration of a fuel tank storage system.

FIG. 1 illustrates an integrally designed roof rack and roof panel 100 on a passenger vehicle 102. Raised portions 104 extend longitudinally along the upper surface of the vehicle, are spaced a distance apart from one another, and at least partially define a cavity therebetween. The size of the cavity and roof rack panel can be varied for the use of a specific type of cargo or varied for a specific brand or type of roof rack. The raised portions 104 are formed to include an opening or slot 106. An additional opposed slot is formed on the driver's side of the vehicle (not shown). At least one cross member 108 is fitted within the opening or slot 106 to serve as cargo holders. At least one raised portion 110 extends longitudinally on the upper surface of the vehicle as strengthening ribs to enhance the stiffness and load bearing capabilities of the upper surface.

In FIG. 2, a cross-sectional view of the integral roof rack and roof panel 100 is shown. The roof rack and roof panel 100 is characterized by an outer panel 112 and an inner panel 114 forming a portion of the upper surface of the vehicle body. The inner panel 114 is operatively connected to the outer panel 112. At least one of the inner panel 114 and outer panel 112 has raised portions 104 extending longitudinally along the vehicle, spaced a distance apart from one another, and at least partially defining a cavity therebetween. A cross member is fitted into the opening or slot 106, designed for a tight and efficient fit that may also be attached and detached easily.

The integrally designed roof rack and roof panel may be formed without a cross member. The roof rack and roof panel may be designed with raised portions defining a cavity for the mounting of a specifically shaped cargo, for example, a bicycle.

Those skilled in the art will recognize a variety of materials that may be employed to form the integral roof rack and roof panel, including various metals and plastics. Those skilled in the art will also recognize a variety of forming techniques that may be employed within the scope of the claimed invention to form the contours of the integral roof rack and panel, such as, but not limited to, injection molding etc. However, quick plastic forming (QPF), superplastic forming (SPF) or sheet hydroforming is preferably employed to form the contours of the integral roof rack and panel. Holes, apertures, and openings are cut, punched, etc, after the contours are formed.

Single Sheet QPF

Quick plastic forming (QPF) is described in U.S. Pat. No. 6,253,588, issued Jul. 3, 2001 to Rashid, et al, commonly assigned to General Motors, which is hereby incorporated by reference in its entirety. For quick plastic forming, a preferred alloy is Aluminum Alloy 5083 having a typical composition, by weight, of about 4% to 5% magnesium, 0.3 to 1% manganese, a maximum of 0.25% chromium, about 0.1% copper, up to about 0.3% iron, up to about 0.2% silicon, and the balance substantially all aluminum. Generally, the alloy is first hot and then cold rolled to a thickness from about one to about four millimeters.

In the AA5083 alloys, the microstructure is characterized by a principal phase of a solid solution of magnesium in aluminum with well-distributed, finely dispersed particles of intermetallic compounds containing the minor alloying constituents, such as $Al_6Mn$.

Using QPF, large AA5083-type aluminum-magnesium alloy sheet stock may be formed into a complex three-dimensional shape with high elongation regions, like a super-plastic formed (SPF) (discussed below) part, at surprisingly higher production rates than those achieved by SPF practices. The magnesium-containing, aluminum sheet is heated to a forming temperature in the range of about 400° C. to 510° C. (750° F. to 950° F.). The forming may often be conducted at a temperature of 460° C. or lower. The heated sheet is stretched against a forming tool and into conformance with the forming surface of the tool by air or gas pressure against the back surface of the sheet. The fluid pressure is preferably increased continuously or stepwise from 0 psi gage at initial pressurization to a final pressure of about 250 to 500 psi (gage pressure, i.e., above ambient pressure) or higher. During the first several seconds up to about, e.g., one minute of increasing pressure application, the sheet accommodates itself on the tool surface. After this initial period of pressurization to initiate stretching of the sheet, the pressure can then be increased at an even faster rate. Depending upon the size and complexity of the panel to be formed, such forming can normally be completed in a period of about two to twelve minutes, considerably faster than realized in superplastic forming. Thus, by working a suitably fine grained, aluminum alloy sheet at significantly lower temperatures and continuously increased, higher gas pressures than typical SPF practices, significantly faster and more practical forming times are achieved for the parts described herein and their equivalents. This particular QPF process described in U.S. Pat. No. 6,523,588 may be referred to as "single sheet" QPF.

Superplastic Forming

Where time is not of the essence, the integral roof rack and roof panel 100 may also be formed by superplastic forming (SPF), as described in U.S. Pat. No. 5,974,847, issued Nov. 2, 1999 to Saunders, et al, commonly assigned to General Motors, which is hereby incorporated by reference in its entirety. When certain alloy compositions of steel or aluminum are suitably processed (such as with a very fine grain microstructure), they exhibit superplastic behavior at certain elevated temperatures. When deformed at these temperatures, the ductility (or elongation before yield or failure) of these materials exceeds several hundred percent. Such high levels of ductility can enable fabrication of very complex structures in a single sheet of material. An upper roof rack panel 116 and lower roof panel 114 of the design discussed above can each be fabricated in one piece using such techniques.

Materials

In addition to various steels and aluminum alloys, other structural materials such as zinc, brass, magnesium, titanium and their alloys have also been reported to exhibit superplastic behavior. These materials and other metal matrix composites could also be used to make the integral roof rack and roof panel 112, 114 of this invention, if desired.

In an example of superplastic forming, a blank, i.e., a sheet, is tightly clamped at its edges between complementary surfaces of opposing die members. At least one of the die members has a cavity with a forming surface opposite one face of the sheet. The other die opposite the other face of the sheet forms a pressure chamber with the sheet as one wall to contain the working gas for the forming step. The dies and the sheet are heated to a suitable SPF condition for the alloy. For SPF aluminum alloys, this temperature is typically in the range of 400° C. to 550° C. Electric resistance heating elements are located in press platens or sometimes embedded in ceramic or metal pressure plates located between the die members and the platens. A suitable pressurized gas such as argon or air is gradually introduced into the die chamber on one side of the sheet, and the hot, relatively ductile sheet is stretched at a suitable rate until it is permanently reshaped against the forming surface of the opposite die. The rate of pressurization is controlled so the strain rates induced in the sheet being deformed are consistent with the required elongation for part forming. Suitable strain rates are usually 0.0001 to 0.01 s-1. During the deformation of the sheet, gas is vented from the forming die chamber.

The '847 patent provides a method of stretch forming a ductile metal sheet into a complex shape involving significant deformation without excessive thinning of the sheet material and without tearing it. The method is particularly applicable to the stretch forming of superplastic alloys heated to a superplastic forming temperature. In the method, additional material from the initially flat sheet blank is pulled or drawn into the forming cavity for stretch forming. The additional material significantly reduces thinning and tearing in the formed part.

The method contributes to thickness uniformity in an SPF stretch-formed component by utilizing controlled draw-in of sheet metal to the forming chamber prior to application of gas pressure. In an illustrative practice, a preform, similar to a stationary male punch, is placed on the forming press platen opposite the die cavity. An aluminum blank, for example, is placed over the insert and heated to a suitable SPF temperature for the alloy. The die is then moved toward its closed position against the platen. In its closing motion, the die engages the edges of the aluminum sheet. The heated metal is pulled over and around the insert, and draw-in of blank material thus occurs. This results in a greater amount of metal in the die cavity prior to SPF blow forming. The quantity of additional metal can be managed by design of the size, shape and location of the preform on the platen or complementary die member. But the additional metal in the die cavity reduces the amount of strain required and, hence, the amount of thinning to form a desired geometry compared to conventional SPF.

Thus, by the judicious use of a suitable space-occupying metal preform on a die or platen member opposite the forming die, additional metal is easily drawn into the cavity during die closure without significantly increasing the complexity of the tooling. Care is taken in the design of the preform to avoid excessive wrinkling of the drawn-in metal and to maintain a tight gas seal at the periphery of the sheet upon full die closure. The uniformity in thickness of the stretch-formed part is improved. Mass of the formed part can be reduced because the designer does not need to resort to thicker blanks to assure part quality. And, except for the simple preform, there is no increase in the complexity of the SPF tooling.

The embodiment shown in FIG. 2 uses two quick plastic formed sheets. Any of the fluid forming technologies discussed below may be used to form the integral roof rack and roof panel 100. The lower roof rack panel 114 and upper roof panel 116 may be formed in a two sheet opposite direction process described below and then joined to one another. Adjacent areas 112 may be joined by a number of joining techniques including laser welding, MIG spot welding, friction stir welding (discussed below), etc. Additionally, metallic foam processes may be utilized to form, for example, the lower roof panel 114.

In addition to the single sheet QPF process and SPF process discussed above, a variety of other fluid forming processes may be used to form the integral roof rack and roof panel. Some applicable processes are briefly summarized below.

Tailor Welded Blanks

A vehicle structure or accessory may be formed as a multi-thickness, single membrane under a fluid forming process such as hydroforming, SPF, or QPF. Under this process, one or both of the inner and outer panels of the roof rack and roof panel 100 of FIG. 2 may be formed by the tailor welded blank process described in U.S. Pat. No. 6,825,442, issued Nov. 30, 2004 to Schroth et al. and commonly assigned to General Motors Corporation, which is hereby incorporated by reference in its entirety. The tailor welded blank process described in the '442 patent allows tailor welded blanks having sheet elements with different values of a physical characteristic, such as sheet thickness, to be processed successfully into components. Many alloy systems including, but not limited to, steel, aluminum, magnesium and titanium materials may be processed to form the tailor welded blank. Hydroforming, SPF and QPF may be used to form the tailor welded blank. The tailor welded blank process utilizes a blank that has variations in the thickness of sheet elements that is amenable to forming in a fluid forming process to large relative strains and consequently into complex shapes. The sheet elements that form the tailor welded blank deform at nearly the same rate even though they have different values of a physical characteristic, such as different thicknesses or different material strength values. Accordingly, for instance, an upper roof rack panel may be formed of two different sheet elements welded together and formed by QPF to form a shape such as that shown in FIG. 2.

Two Sheet, Opposite Direction Formation

Referring again to FIG. 2, the integral roof rack and roof panel 100 may be formed using a plural sheet forming process in which the outer and inner panels 112, 114 are simultaneously formed to the respective shapes of opposing dies by directing pressurized air between the blanks, forcing the blanks in opposite directions toward the opposing dies. Such a process is described in U.S. Pat. No. 6,675,621, issued Jan. 13, 2004 to Kleber and commonly assigned to General Motors Corporation, which is hereby incorporated by reference in its entirety. By forming the outer and inner panels 112, 114 of the integral roof rack and roof panel 100 simultaneously in a pair of dies, the output of the superplastic forming equipment, including the dies, is multiplied for improved efficiency. The '621 patent provides for simultaneous formation of at least two sheets of superplastic formable blanks into two separate components from the same pressurization.

A process for simultaneously forming two superplastic formable parts to upper and lower die halves is described in U.S. Pat. No. 6,694,790, issued Feb. 24, 2004 to Ryntz et al., commonly assigned to General Motors, which is hereby incorporated by reference in its entirety. The '790 patent utilizes a mid-plate that supports and separates the blank sheets (e.g., the sheets used to form the outer and inner panels 112, 114) between forming dies. An inner chamber is formed by the mid-plate. Pressurized gas is introduced into the inner chamber, thereby expanding the sheets away from one another onto structure of the dies to simultaneously form discreet parts reflective of the upper and lower forming surfaces. This method utilizing a mid-plate may be used with a die having equivalent upper and lower surfaces, thus providing duplicate parts with each pressurization or the upper and lower dies may have differing forming surfaces, thus forming two different parts with each pressurization (such as the outer and inner panels 112, 114).

Thus, the two sheet, opposite direction processes disclosed in the '621 patent and in the '790 patent allow for efficient superplastic or quick plastic forming of automotive components.

Metallic Foam Forming Process

The integral roof rack and roof panel 100 of FIG. 1 may be formed by a method of metallic sandwiched foam composite forming as described in A Method of Metallic Sandwiched Foam Composite Forming, U.S. patent application Ser. No. 10/738,345, commonly assigned to General Motors Corporation, filed Dec. 17, 2003 by Morales et al., and hereby incorporated by reference in its entirety, or by a method for producing in situ metallic foam components, as described in Method for Producing In Situ Metallic Foam Components, U.S. patent application Ser. No. 10/738,884, commonly assigned to General Motors Corporation, filed Dec. 17, 2003 by Morales et al., and hereby incorporated by reference in its entirety. The sandwiched foam composite forming method involves subjecting a planar metal sheet to an SPF or QPF process. Either during or after the SPF or QPF processing of the sheet metal, a composite structure is formed by coupling a metal foam layer to the formed metallic sheet. As described in application Ser. No. 10/738,345, the coupling of the metallic foam to the QPF or SPF metal sheet may be accomplished by using adhesives or brazing materials which are deposited between the deformed metallic sheet and the foam substrate. In addition, the QPF or SPF formation of the sheet metal may include forming a pair of locking interfaced surfaces which can be elastically deformed to engage a pair of sculpted surfaces on the foam material.

The foam substrate may be coupled to the QPF or SPF sheet during the QPF or SPF forming process. In that case, the foam substrate is sculpted prior to forming and is inserted into a QPF die with the unformed sheet metal. QPF or SPF may then be applied to deform the metal sheet about the sculpted foam. Alternatively, the formation of the foam substrate may occur during the SPF or QPF processing of the sheet metal. When the composite structure is formed, the foam substrate can then be adhered to the sheet metal by fusion or with the use of braze material disposed in the construction. Alternatively, the coupling may occur by mechanical interaction or fusion coupling of the foam to the sheet metal. Finally, the foam substrate may be bonded to the sheet metal prior to the QPF or SPF processes. As described in application Ser. No. 10/738,345, SPF and QPF may be used to form foam, a one sided sandwich foam composite (i.e., sheet metal on only one side of the foam) or a two sided sandwich foam composite (i.e., foam having a sheet metal on either side). The foam, the one sided or the two sided sandwich foam composite, is then processed by QPF or SPF within a die or forming tool such that the foam or sandwich panel conforms to the shape of the die or tool forming surface.

As described in application Ser. No. 10/738,884, a method for producing in situ metallic foam components may be used in forming the integral roof rack and roof panel 100 of FIG. 1. Foam precursor materials formed from a mixture of metal powders (elementary metal powders, alloy powder or a metal powder blend) and a blowing agent (for example, $TiH_2$) is compacted to densely formed, semi-finished, precursor element). The composite of sheet metal and foam precursor is then subjected to an SPF or QPF forming technique which both forms the sheet metal and causes forming of the metal foam precursor such that it forms to a desired shape pursuant to the adjacent die formation. Alternatively, metal sheets may sandwich an intermediate metal foam precursor layer. The sandwich structure is then subjected to a QPF or SPF forming process within the die to form a deformed sheet metal sandwich. The deformed sheet metal sandwich is then heated to a temperature greater than the formation temperature so as to form the metal foam precursor. Accordingly, a single forming operation provides complex composite structures of low weight metallic composites. The composites provide excellent energy absorption properties, and dent resistance. Referring to FIG. 4, a metal foam precursor may be adhered or fused to an underside of the outer panel 112 to form a reinforcing patch thereon. Alternatively, metallic foam precursor may be used between the outer and inner panels 112, 114 prior to QPF or SPF forming thereof.

Accessories, External Hardware and Contained Volumes

A multitude of accessories, external hardware and contained volumes for use in the interior and exterior of a vehicle may be formed using single sheet quick plastic forming, multiple sheet quick plastic forming, blow forming, tailor welded blanks, metallic foam forming or variations of the quick plastic forming metal forming technology which may be made of the superplastic forming of metals like magnesium and aluminum. A luggage and container storage system, fuel tank storage system, console and storage volume, door unit storage system, truck bed with cover, truck bed with integral storage unit, spare tire carrier, table tray and integral sunroof, formed using any of the processes described above, is described herein.

Luggage and Containers

QPF forming technology and its variants may be utilized to produce low mass vehicle storage containers while also offering the rigidity of structure during use. Storage container systems may be flexible, to fit in a variety of vehicles, or dedicated to a specific use of space (i.e., shaped to conform to a particular area of a given vehicle). Referring to FIG. 3, an example of a dedicated storage system 200 is illustrated. The storage system 200 includes fitted luggage that is shaped to key into storage areas of the vehicle 202. For example, fitted side luggage 204 is formed to conform to the side 206 and floor 208 of a rear cargo area 210. Additional fitted side luggage (not shown) conforms to the opposing side of the vehicle cargo area 210, in a symmetrical fashion. The sides 206 may include specific contours (not shown). Accordingly, the side luggage 204 is shaped using a QPF technology to follow such contours. Additionally, the storage system 200 further includes floor fitted luggage 212 that is shaped by a QPF forming technology to conform to a recessed floor area 214. Accordingly, both the side luggage 204 and floor fitted luggage 212, by conforming to adjacent areas of the vehicle, permit maximum retention of available cargo space. Referring to FIG. 4, the storage system 200 is removable from the vehicle to provide the convenience of traditional luggage.

Fuel Tanks

By utilizing QPF forming technology and its variants, fuel tanks may be made for installation into a vehicle. Referring to FIG. 5, an example of a QPF fuel tank 300 is illustrated. The fuel tanks may be made of blow-molded cavities. The tanks may be of varying shapes and sizes and designed to fit into corresponding recesses in the vehicle. The tanks may be designed for placement in difficult areas of the vehicle. By fitting into corresponding areas of the vehicle, space is maximized. Multiple fuel tanks of varying shapes and corresponding recesses in a single vehicle may be employed. Using QPF technologies described above, reinforcement panels may be layered in the tanks in certain areas for enhanced structural rigidity. As shown in FIG. 5, the fuel tank 300 is removable from the vehicle 302.

A fuel tank that is integral with surrounding body componentry such as the rear floor pan may be formed using any of the QPF processes described above. For example, the ability to use stacked metal sheets, bonding some adjacent areas while inserting pressurization between other adjacent areas, enables the contained tank cavity to be integrated with other body formations.

Consoles and Storage Volumes

Figure 6:
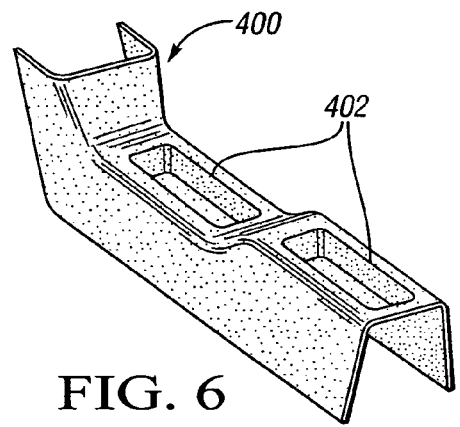
FIG. 6 is a schematic illustration of a console with storage volumes.

A vehicle console and storage unit may be formed using any of the QPF processes described above. QPF processing permits the console to be integrated with surrounding body components such as floor pans. Consoles may have complex shaping requirements, enabling a cup holder and other storage features formed into their surfaces. FIG. 6 illustrates an example of a console 400. The console may have cavities 402 shaped for storage. The size and shape of the cavities may be varied for specific items. The console and storage unit may be located between the driver and passenger seats, between the second row passengers, or in the rear of a vehicle. They may be designed to slide using armatures, tracks and fixtures for repositioning in a vehicle. By using QPF forming processes, console having many such features may be formed from a minimal number of separate components.

Door Unit With Storage

Figure 7:
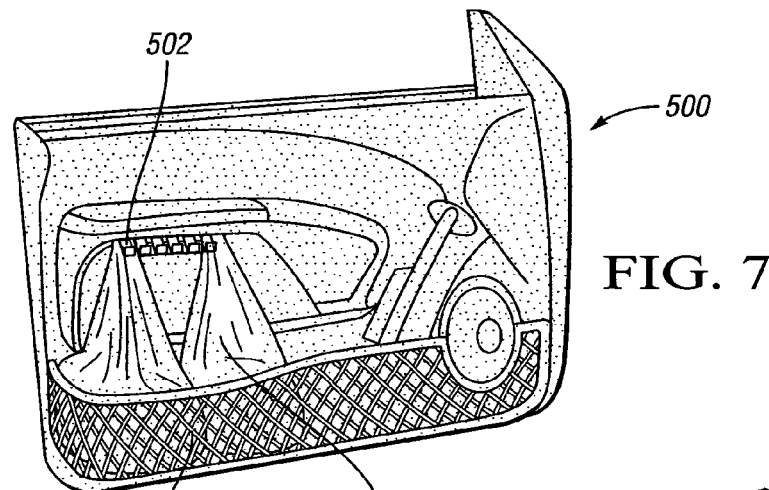
FIG. 7 is a schematic perspective illustration of a door unit storage system.
Figure 8:
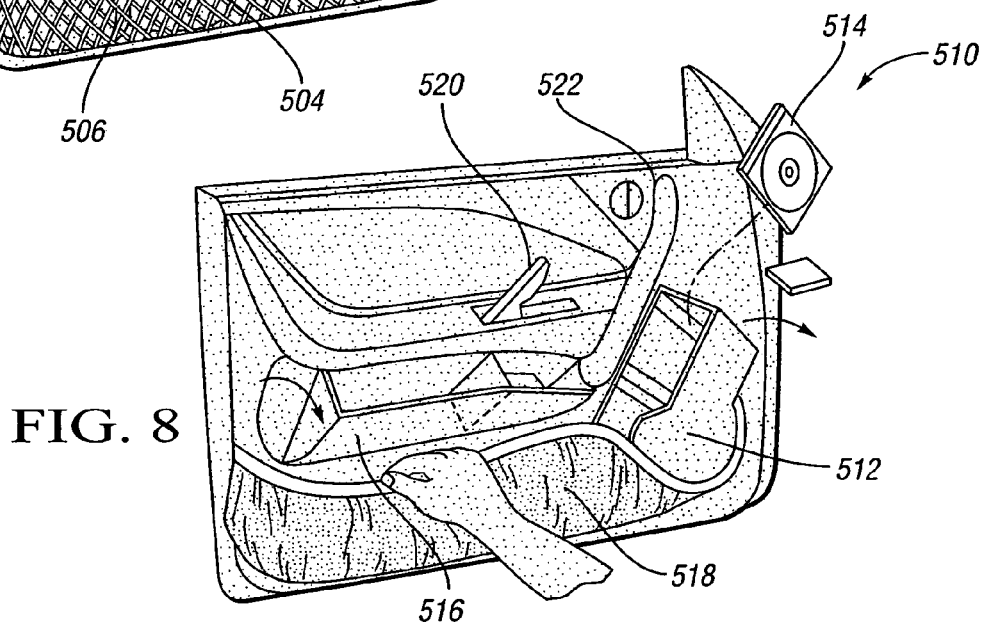
FIG. 8 is a schematic perspective illustration of an alternative door unit storage system.

A door unit with cavities for open and closed storage may be formed using any of the QPF processes described above. QPF processing permits the door unit to be integrated with surrounding body components. Referring to FIG. 7, an example of a door unit with storage system 500 is illustrated. The unit may have a flip down hook 502 for hanging items 504, for instance, grocery bags or purses. The items hung may be tucked within a door trim panel 506. The door trim panel may be fastened and bolted onto the door panel. FIG. 8 illustrates another example of a door unit with storage system 510. Utilizing QPF forming technology and its variants allows for a lockable pull-out storage drawer 512. The drawer may be used for storing a variety of items, for example, audio media items 514. The door unit 510 in FIG. 8 illustrates a drop-down storage compartment 516. Also shown is a door trim expandable pocket 518 for the storage of larger items in the door unit. A door latch release handle 520 and pull handle 522 is shown. By using QPF forming processes, a door storage unit with many complex features may be formed from a minimal number of separate components. The door unit may contain door electronics (not shown) and other installed hardware and may be utilized for sound deadening and isolation of the exterior from the interior.

Truck Bed With Cover

Figure 9:
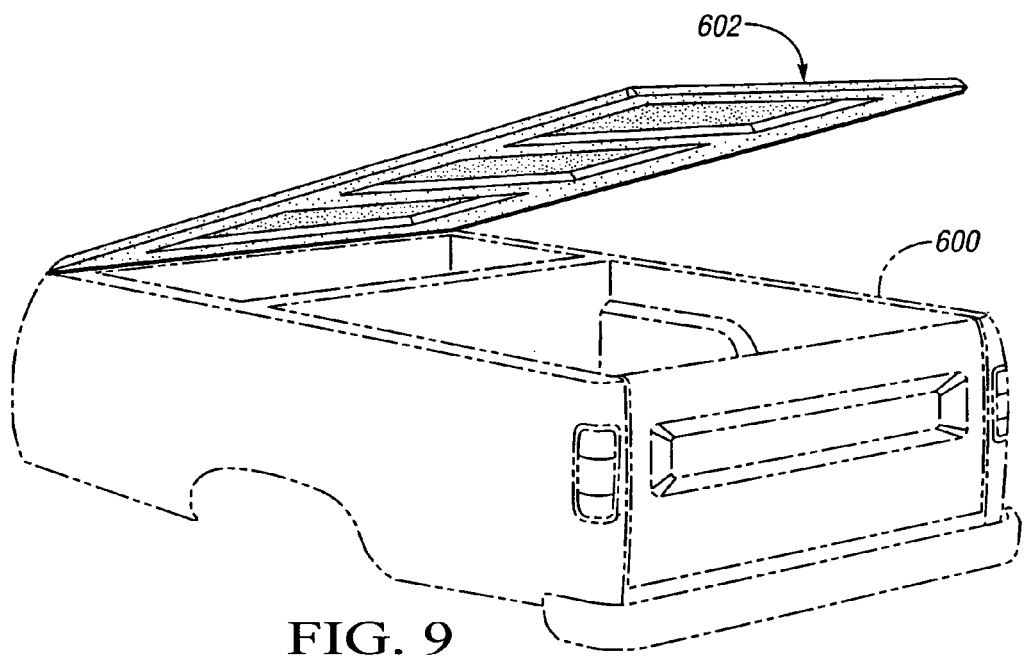
FIG. 9 is a schematic perspective illustration of a truck bed with a cover.

A variety of strong, low mass vehicle closures may also be formed using QPF processes and its variants discussed above. Referring to FIG. 9, a truck bed 600 with a cover 602 formed using QPF processes is illustrated. The truck bed cover 602 may be a unitary panel. The truck bed cover 602 may be designed with ribs or shaped cavities to enable the placement of cargo above the truck bed cover 602. This results in two levels of storage in the truck. Use of QPF forming processes allows for complex features to be formed from a minimal number of separate components. The structure may be varied to have hinged volumes for varied access. The low mass truck bed cover 602 may be removable from the vehicle. As discussed above, separate matable sheets or a single sheet, often subjected to a bending process, may be utilized in forming such components.

Truck Bed With Integral Storage Unit

Figure 10:
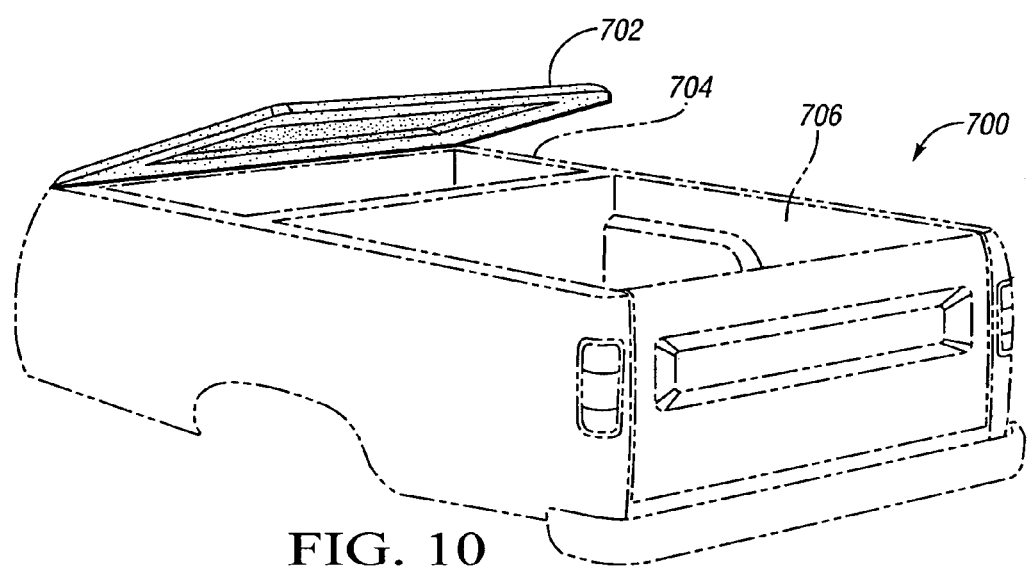
FIG. 10 is a schematic perspective illustration of a truck bed with integral storage unit.

By utilizing QPF forming technology and its variants, integral storage units in the truck bed can be formed. Referring to FIG. 10, a truck bed with an integral storage unit 700 is illustrated. The storage unit has a cover 702 that is lockable and may be designed with cavities for storage. The storage unit may have tracks for movement from the rear of the truck bed to the front (not shown). Multiple integral storage units may be formed using QPF processes, in a variety of shapes and sizes. For instance, two storage units 704 and 706 may be formed for holding tools or other items. The use of QPF forming technology enables the integral truck bed storage units to be rugged and lightweight.

Sunroof

Figure 11:
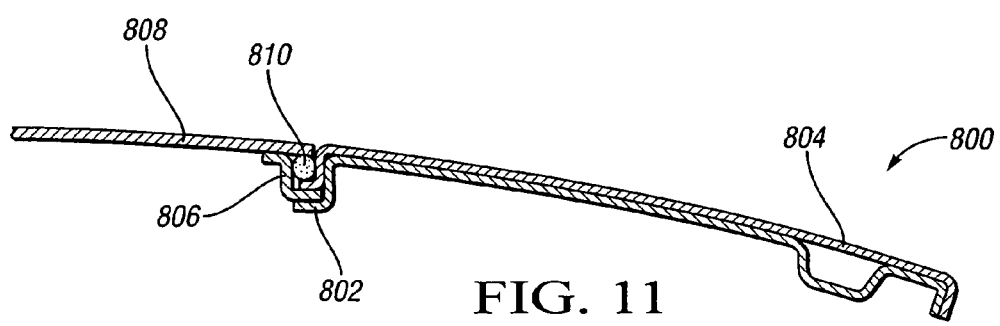
FIG. 11 is a fragmentary schematic illustration of a roof cross section with sunroof.

A vehicle sunroof may be formed using any of the QPF processes described above. Referring to FIG. 11, a cross section of a roof module 800 with a sunroof is illustrated. The roof module is characterized by inner and outer panels, 802 and 804. The roof inner and outer panels 802 and 804 may be made of sheet metal blanks using any variation of the QPF/SPF forming technologies described above. The roof inner panel 802 has an integral roof track. The roof outer panel 804 has an integral bulb seal seat. Partially between the inner panel 802 and outer panel 804 is a slide bracket 806. The slide bracket 806 is bonded to a sliding glass panel 808. The glass panel 808 may be slid along the roof track. An elastomeric bulb seal 810 is shown in FIG. 11. A roof module may also be made where the sunroof does not open.

Table Trays

Table trays may be formed from any of the QPF processes discussed above. By using QPF processing, these convenient trays may be integrated into body panels adjacent to passenger positions within the vehicle. For instance, QPF processing permits a table tray to be integrated with an adjacent component such as a vehicle seat, vehicle roof or a vehicle door or quarter panel. By using QPF processing, the fit of the table tray to such an adjacent body component is optimized. Table trays may be designed to pivot out from the adjacent body component into the servicing position. Table trays may contain cavities for placement of items or storage, such as cup holders.

Spare Tire Carrier

A typical spare tire carrier (i.e., the well typically found in the rear of the vehicle, beneath a layer of carpeting) is formed from multiple stamped pieces that support a spare tire. Such a spare tire carrier may be formed using any of the QPF processes described above. By employing QPF processing, the spare tire carrier may be made from a minimal number of separate components. Optimally, a single sheet may be used to form the complex curved shape necessary to support and carry the tire.

As described above, a multitude of vehicle accessories and structures may be formed using QPF processing. By utilizing QPF processing, many of these interior and exterior features may be integrated with adjacent vehicle components, thus minimizing the number of components required and reducing assembly time.

While the best modes for carrying out the invention have been described in detail, those familiar with the art to which this invention relates will recognize various alternative designs and embodiments for practicing the invention within the scope of the appended claims.

The invention claimed is:

1. A vehicle body comprising:
a metal inner panel;
a metal outer panel forming a portion of the upper surface of the vehicle body;
said metal inner panel operatively connected to said metal outer panel; wherein at least one of said metal inner and said metal outer panel has raised portions extending longitudinally, spaced a distance apart from one another, and at least partially defining a cavity therebetween;
wherein at least one of said raised portions at least partially defines an opening;
a cross member at least partially within said opening and extending transversely across said upper surface of said vehicle body;
wherein said opening is elongated so that said member may be selectively translatable fore and aft.

2. The vehicle body of claim 1, wherein said metal outer panel defines at least one strengthening rib for enhancing the stiffness and load bearing capabilities of said metal outer panel.

* * * * *